C. L. H. WRAAE & J. LIDDELL.
SPRING WHEEL.
APPLICATION FILED NOV. 1, 1912.
1,097,114.   Patented May 19, 1914.
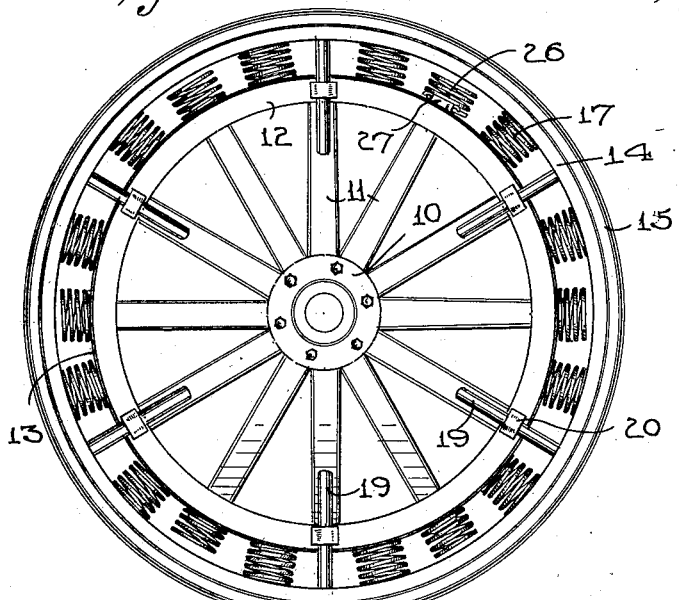
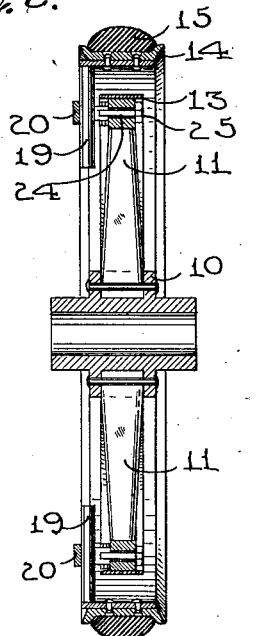
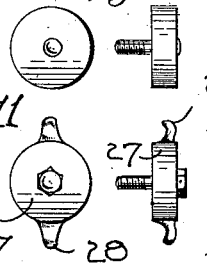
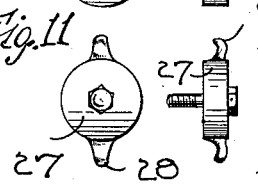
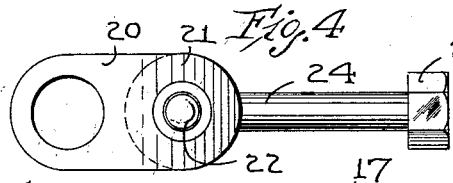
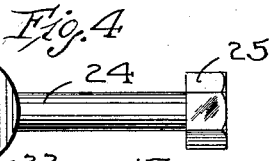
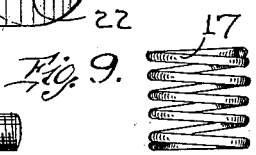
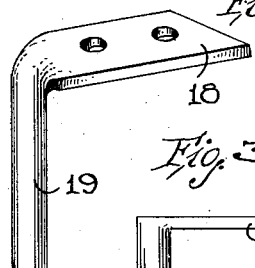
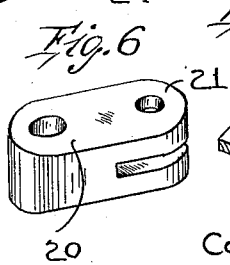
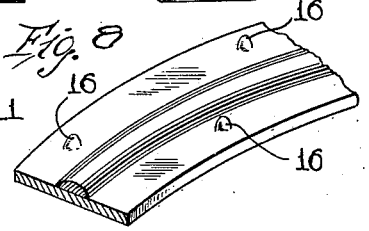
WITNESSES
Robert M. Sutphen
Irv. L. McCathan
INVENTORS
Carl L. H. Wraae
James Liddell
By E. E. Vrooman   Attorney

UNITED STATES PATENT OFFICE.

CARL LAURITS HENRECK WRAAE AND JAMES LIDDELL, OF CUBA, WISCONSIN.

SPRING-WHEEL.

1,097,114.  Specification of Letters Patent.  Patented May 19, 1914.

Application filed November 1, 1912. Serial No. 729,092.

*To all whom it may concern:*

Be it known that we, CARL L. H. WRAAE and JAMES LIDDELL, citizens of the United States, residing at Cuba city, in the county of Grant and State of Wisconsin, have invented certain new and useful Improvements in Spring-Wheels, of which the following is a specification, reference being had therein to the accompanying drawing.

This invention relates to vehicle wheels and has special reference to a resilient wheel adapted for use in connection with automobiles and other like vehicles.

The principal object of the invention is to improve and simplify the general construction of such wheels.

Another object of the invention is to provide an improved means for securing an inner rim and felly together.

With these and other objects in view this invention consists in certain novel combinations, constructions and arrangement of parts as will be hereinafter fully described and claimed.

In the accompanying drawings:—Figure 1 is a side elevation of a wheel constructed in accordance with this invention. Fig. 2 is a section therethrough. Fig. 3 is a view of the means used to hold the two rims together, assembled but removed from the wheel the sleeve member being shown in section. Fig. 4 is a plan view of the link and bolt securing device removed from the wheel. Figs. 5, 6, and 7 are detail views of certain parts of the securing device disassembled. Fig. 8 is a perspective view of a portion of the modified form of the outer tire. Fig. 9 is a side elevation of one of the coil springs used in connection with the present invention. Fig. 10 is a side elevation of one of the clips for holding the coil springs in position. Fig. 11 is a top view of the device illustrated in Fig. 10. Fig. 12 is a top plan view of one of the sockets used with the primary springs of the wheel. Fig. 13 is a side elevation of one of the spring sockets used for holding the primary springs upon the felly and rim. Fig. 14 is a perspective view of the sleeve adapted to fit over the bolt for holding the knuckle block in position.

When carrying out the objects of the invention we provide a hub 10 from which radiate spokes 11 which carry on their outer ends a rim 12 constituting the inner rim of the wheel. This rim is preferably provided with a metallic band 13. Surrounding the rim 12 and in spaced relation thereto is a felly 14 which may either be provided with a solid rubber tire 15 or the felly may be left bare and provided with antiskidding lugs 16 as shown in Fig. 8. Between the felly and the member 13 are coil springs 17. Between the adjacent coil springs there is secured to the felly a series of L-shaped members, one arm of each being flat as indicated at 18 for the purpose of attachment on the inner side of the felly. The other arm extends radially inward from the felly and is preferably circular in cross section as at 19. Each of these arms 19 is slidably mounted in a block 20 which we preferably term a knuckle block, and this knuckle block is provided with spaced jaws 21 wherethrough passes a pivot pin 22, the pin also passing through the eye bolt 24 which extends through the rim 12 and is held in position by a suitable nut 25. By means of this construction movement of the felly with respect to the inner rim is permitted while at the same time the driving of the vehicle from the axle in the usual manner is also assured.

There has thus been provided a simple and efficient device of the kind described and for the purpose specified.

Auxiliary springs 26 are connected to the rim 12 by means of the clips 27 and these clips are provided with overhanging ears 28, which ears engage the lower coil of the springs 26. Under ordinary circumstances the springs 26 do not engage the felly 14.

When this wheel is in use the springs give the desired resiliency while the L-shaped members constitute guides for preventing the springs from being bent or torn loose when making turns.

Having thus described the invention what is claimed as new, is:—

A wheel comprising an inner rim, an outer rim surrounding said inner rim, means for holding said outer and inner rims in spaced relation, eye-bolts passing transversely through said inner rim, links pivotally connected with said eye-bolts and having their outer end portions provided with openings formed in alinement with the spokes of said inner rim, rods slidably mounted in the openings of said links, and enlarged flattened heads at the outer ends of said rods secured to said outer rim.

In testimony whereof we hereunto affix our signatures in presence of two witnesses.

CARL LAURITS HENRECK WRAAE.
JAMES LIDDELL.

Witnesses:
A. B. FOLEY,
WALTER LARSEN.

Copies of this patent may be obtained for five cents each, by addressing the "Commissioner of Patents, Washington, D. C."